US006610265B2

United States Patent
Szydlowski et al.

(10) Patent No.: US 6,610,265 B2
(45) Date of Patent: Aug. 26, 2003

(54) METHOD AND SYSTEM FOR DESULFURIZING GASOLINE OR DIESEL FUEL FOR USE IN A FUEL CELL POWER PLANT

(75) Inventors: Donald F. Szydlowski, Ellington, CT (US); Roger R. Lesieur, Enfield, CT (US); Richard A. Sederquist, Middletown, CT (US)

(73) Assignee: UTC Fuel Cells, LLC, So. Windsor, CT (US)

( * ) Notice: Subject to any disclaimer, the term of this patent is extended or adjusted under 35 U.S.C. 154(b) by 68 days.

(21) Appl. No.: 10/042,015

(22) Filed: Jan. 10, 2002

(65) Prior Publication Data

US 2003/0031616 A1 Feb. 13, 2003

Related U.S. Application Data

(60) Provisional application No. 60/309,130, filed on Jul. 31, 2001.

(51) Int. Cl.[7] ................................. B01J 19/00
(52) U.S. Cl. .................. 423/242.1; 423/246; 423/416; 423/511; 423/652; 422/168; 422/178; 422/212; 429/13; 429/17; 502/20; 502/34; 502/514; 502/517
(58) Field of Search ................................. 422/168, 178, 422/212; 423/242.1, 246, 416, 652, 511; 429/13, 17; 502/20, 34, 514, 517

(56) References Cited

U.S. PATENT DOCUMENTS 3,294,706 A * 12/1966 Constabaris et al. ........ 252/412

3,764,661 A * 10/1973 Kanazawa et al. .......... 423/416
5,124,140 A * 6/1992 Okada et al. ............... 423/650
5,658,681 A * 8/1997 Sato et al. ................... 429/13

FOREIGN PATENT DOCUMENTS

DE          35 20 166 A1  * 12/1986
GB          1439489       *  6/1976

* cited by examiner

*Primary Examiner*—Stanley S. Silverman
(74) *Attorney, Agent, or Firm*—William W. Jones

(57) ABSTRACT

A fuel processing system is operative to remove substantially all of the sulfur present in a logistic fuel stock supply. The fuel stock can be gasoline, diesel fuel, or other like fuels which contain relatively high levels of organic sulfur compounds such as mercaptans, sulfides, disulfides, and the like. The system is a part of a fuel cell power plant. The fuel stock supply is fed through a reformer where the fuel is converted to a hydrogen rich fuel which contains hydrogen sulfide. The hydrogen sulfide-containg reformer exhaust is passed through a sulfur scrubber, to which is added a small quantity of air, which scrubber removes substantially all of the sulfur in the exhaust stream by means of the Claus reaction. The desulfurizing step causes sulfur to deposit on the scrubber bed, which after a period of time, will prevent further sulfur from being removed from the reformer exhaust stream. The sulfur scrubber station is rejuvenated by passing a gas stream containing a relatively small amount (about 1% by volume) of carbon monoxide. The carbon monoxide is converted to carbonyl sulfide which is then burned in power plant burner so as to form sulfur dioxide in the power plant exhaust stream.

14 Claims, 2 Drawing Sheets

US 6,610,265 B2

METHOD AND SYSTEM FOR DESULFURIZING GASOLINE OR DIESEL FUEL FOR USE IN A FUEL CELL POWER PLANT

This application claims the benefit of U.S. S No. 60/309,130, filed Jul. 31, 2001.

The U.S. Government has a paid-up license in this invention and the right in limited circumstances to require the patent owner to license others on reasonable terms as provided for by the terms of contract No. DAAH04-94-C-0010 awarded by the United States Army.

TECHNICAL FIELD

The present invention relates to a method and system for desulfurizing gasoline, diesel fuel or like hydrocarbon fuels so as to reduce the sulfur content of the fuel and render the fuel suitable for use in a fuel cell power plant. More particularly, the method and system of this invention include the use of a sulfur scrubber which utilizes a modified version of the Claus reaction, and also include a technique for regenerating the sulfur scrubber bed by removing sulfur from the scrubber bed.

BACKGROUND OF THE INVENTION

Gasoline, diesel fuel, and like hydrocarbon fuels can be useful as a stock fuel for powering a fuel cell power plant if the sulfur compounds in such stock fuels are removed from the fuel stream prior to its entry into the fuel cell stack section of the power plant. The sulfur compounds are undesirable since they are known to poison catalysts used in the fuel fuel processor and cell stack sections of the power plant. These fuels and other sulfur-containing fuels can be reformed to produce a hydrogen-rich gas stream. After the fuels have been reformed, they are typically passed through a sulfur scrubber bed which converts the hydrogen sulfide in the reformed fuel stream to sulfur and water, or in the case of a metal oxide scrubber such as zinc oxide, to a metal sulfide, such as zinc sulfide, and water. The scrubbing reaction causes sulfur to deposit on the scrubber reagent and after a time, the scrubbing reagent will be so sated with sulfur as to be incapable of removing sufficient sulfur from the reformer exhaust stream. When this condition comes about, the scrubber bed will be removed from the power plant, discarded, and replaced with a fresh scrubber bed. Sulfur content detectors are used to monitor the sulfur content of the effluent from the sulfur scrubber bed and to indicate when the scrubber bed should be replaced.

It would be highly desirable to provide a fuel cell power plant which includes a sulfur scrubber rejuvenating system which utilizes a by-product of the power plant to remove sulfur from the scrubber, so that sulfur-containing fuels can be processed for use in providing a hydrogen-rich fuel which can be used in the fuel cell stack power section of the power plant.

DISCLOSURE OF THE INVENTION

This invention relates to a system and method for processing a reformed sulfur-containing fuel such as gasoline, diesel fuel, or some other sulfur-containing hydrocarbon fuel stream over an extended period of time, which system and method are operative to remove substantially all of the sulfur present in the reformed fuel stream, which sulfur is present in the form of hydrogen sulfide. A sulfur-scrubbing bed is included in the system, which bed converts the hydrogen sulfide in the reformed fuel stream, to which a small quantity of oxygen has been added, to elemental sulfur and water by means of the Claus reaction, the elemental sulfur being removed from the gas stream and being deposited on the scrubbing bed.

SPECIFIC MODE FOR CARRYING OUT THE INVENTION

Figure 1:
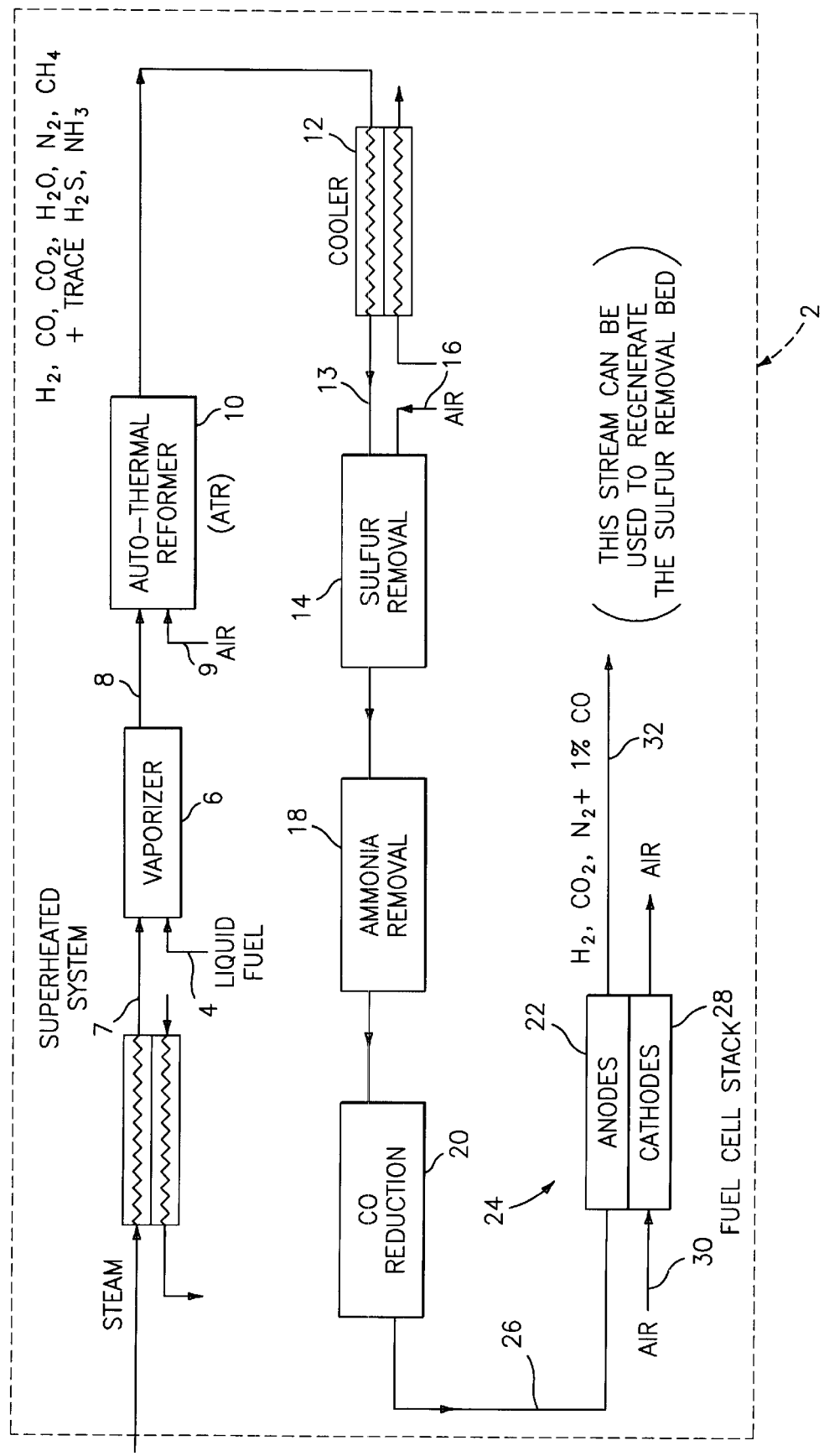
FIG. 1 is a schematic view of a fuel cell power plant which includes a sulfur scrubbing bed.

Referring now to the drawings, FIG. 1 is a schematic view of a portion of a fuel cell power plant which is denoted generally by the numeral 2, and which includes a sulfur scrubbing station. The power plant 2 includes a fuel inlet line 4 through the raw fuel to be processed is admitted into the power plant 2. When the fuel enters the plant 2 in a liquid state, it will be passed through a vaporizer 6 which is heated with superheated steam from a line 7 The vaporized fuel then passes through a line 8 to an autothermal steam reformer or partial oxidation reformer 10 which catalytically converts the vaporized fuel to a hydrogen-rich fuel gas stream which also includes CO, $CO_2$, $H_2O$, $N_2$, $CH_4$, and traces of $H_2S$ and $NH_3$. Air is admitted into the reformer 10 through line 9. The reformed fuel gas stream then passes through a cooler 12 where the fuel gas stream is brought to a temperature which is above the dew point of the fuel gas stream and which temperature is suitable for the sulfur scrubbing operation, typically about 82° C. The reformed fuel stream then passes through a line 13 to a sulfur scrubber bed 14 wherein the hydrogen sulfide in the gas stream is converted to elemental sulfur which precipitates out on the catalyst bed in the scrubber bed 14, and water. A small amount of air is admitted into the scrubber station 14 through line 16. The fuel gas stream then passes through an ammonia removal bed 18 and then a carbon monoxide (CO) reduction station 20 wherein the amount of CO in the fuel gas stream is reduced. The fuel gas stream is then fed into the anode side 22 of the fuel cell power plant stack 24 through line 26 and oxygen (air) is fed into the cathode side 28 of the stack 24 through line 30. If the power plant in question is a phosphoric acid fuel cell (PAFC) plant, then the anode exhaust can be used to regenerate the sulfur scrubber bed as is shown in FIG. 1. The PAFC anode exhaust which contains about 1% by volume CO exits the stack 24 through line 32. When the power plant is a polymer electrolyte membrane (PEM) fuel cell power plant, an exhaust gas stream from a shift converter or reformer can be used as a source of CO since there is no CO in a PEM fuel cell anode exhaust.

Figure 2:
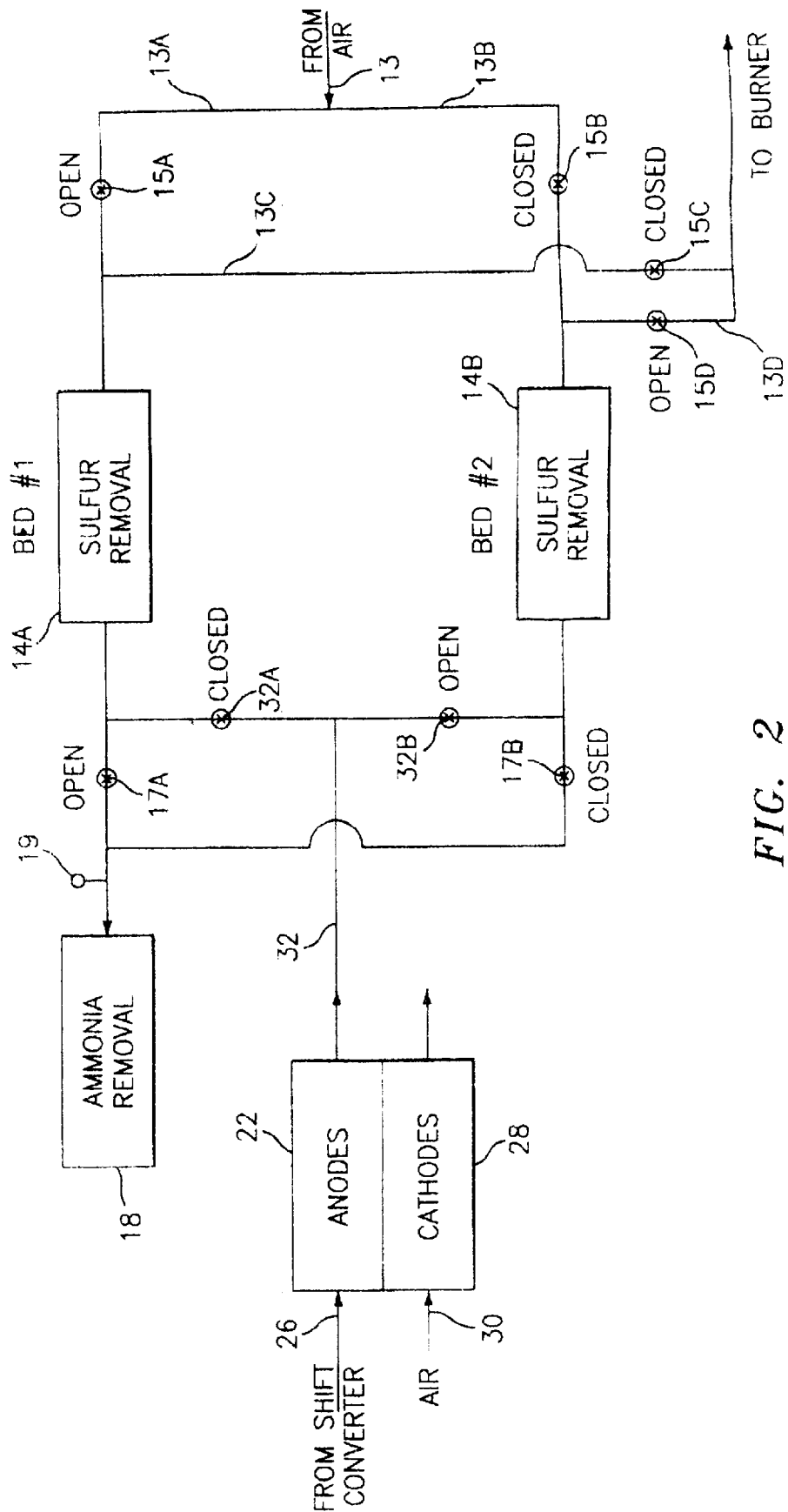
FIG. 2 is a schematic view similar to FIG. 1 but showing more than one sulfur scrubbing bed in the power plant, and a system for rejuvenating one of the sulfur scrubbing beds while another of the sulfur scrubbing beds is being used to remove sulfur from the reformed fuel gas stream.

Referring now to FIG. 2, there is shown a modification of the aforesaid sulfur removal portion of the fuel cell power plant which enables the sulfur scrubber station or bed 14 to be rejuvenated or regenerated by removing elemental sulfur from the scrubber bed. The line 13 from the reformer 10 is bifurcated into at least two branches 13A and 13B. There could be more than two such branches. Each branch 13A and 13B leads to a respective sulfur removal bed 14A and 14B respectively. The flow of the gas stream through the branch 13A to the sulfur removal bed 14A is selectively controlled by a valve 15A; and the flow of the gas stream through the branch 13B to the sulfur removal bed 14B is selectively controlled by a valve 15B. The valves 15A and 15B will be selectively opened and closed by a fuel cell power plant computer controller (not shown) so as to operate as follows.

At startup of the power plant, the valve 15A can be opened, and the valve 15B can be closed, or visa versa. In this condition, one of the scrubber beds 14A and 14B will be capable of removing sulfur from the reformed fuel gas stream, but only the open bed 14A, or 14B will receive the reformed fuel gas stream while the other bed 14A or 14B will not receive the reformed fuel gas stream. Assume that the valve 15A is opened and the valve 15B is closed. Since the system is being started up, both of the beds 14A and 14B will be sulfur-free at the time of startup. With this configuration, the fuel stream from the reformer will pass through the sulfur scrubber 14A and thence through a valve 17A which will be open and into the ammonia removal bed 18. The desulfurized fuel stream ultimately enters the anode side 22 of the fuel cell stack and the anode exhaust stream passes through the sulfur scrubber 14B through line 32 and valve 32B, which is open. The anode exhaust then passes through a valve 15D which is open and a line 13D to the power plant burner (not shown). In this configuration, the valves 32A and 15C are closed.

The system can be run in this configuration for a predetermined period of time after startup, or a sulfur level sensor 19 can be used to monitor the sulfur levels in the exhaust from the scrubber 14A. After the predetermined time period or when the sensor 19 detects an undesirable level of sulfur in the scrubber exhaust stream, the scrubber 14A is shut down, and the scrubber 14B is opened up. This is accomplished by closing valve 15A and opening valve 15B. This prevents the reformer exhaust stream from flowing through the scrubber 14A and allowing the reformer exhaust stream to flow through the scrubber 14B. At the same time, the valve 17A is closed and the valve 17B is opened. This allows the desulfurized fuel stream to flow from the scrubber 14B past the sensor 19, if included, and through the ammonia removal station 18. Likewise, the valve 32B will be closed and the valve 32A will be opened. This causes the anode exhaust stream to flow through the spent scrubber bed 14A. As previously noted, the reason that the scrubber 14A has been shut down is due to a build up of elemental sulfur on the surface of the bed. As also previously noted in the case of a PAFC power plant, the anode exhaust stream contains a small amount of CO when it leaves the anode side 22 of the stack. The temperature of the anode exhaust stream is above the dew point of the gas, and when the CO passes through the scrubber 14A, it converts the S to COS, a gas, which then exits the scrubber 14A through line 13C. At the time of the changeover, the valve 15D will be closed and the valve 15C will be opened. The gas stream carrying the COS thus flows through the line 13C to the power plant burner where the COS is oxidized to $SO_2$ and CO2. The scrubber 14A is exposed to the anode exhaust stream for a period of time needed to convert essentially all of the S on the scrubber bed to COS so as to remove the elemental sulfur from the surface of the scrubber bed 14A. During this period of time, the scrubber 14B will be removing sulfur from the reformer exhaust fuel stream, and will itself be experiencing a buildup of elemental sulfur on its active surface. At an appropriate time, the system is switched back to its initial configuration, whereby the scrubber 14A will desulfurize the fuel stream and the scrubber 14B will be desulfurized by the anode exhaust stream. The active surface in the sulfur scrubber beds can be formed from a potassium-promoted activated carbon, or some other effective material, such as Group I metals on a large surface area support.

It will be appreciated that the power plant can be operated continuously for longer periods of time using the sulfur scrubbing system of this invention, and the spent sulfur scrubbing beds need not be removed and discarded or desulfurized in some adjunct system. The use of a gas stream containing CO and a small amount of $O_2$ to remove elemental sulfur from a sulfur scrubbing bed by converting the S to COS enables one to lower the sulfur content of the scrubbing bed to levels of about 10 PPB, whereas, when the prior art metal oxide beds are used to remove sulfur from the gas stream, the regeneration of the oxide bed can only result in a remaining sulfur concentration of about 500 PPB. This is because of the thermodynamic equilibrium with ZnO, $H_2O$ and $H_2S$. As a result, the sulfur removal bed of this invention can be much more compact and have a longer operating life, and due to the fact that it is not limited by the thermodynamic $ZnO/H_2S/H_2O$ equilibrium, can maintain a much lower sulfur level than a conventional sulfur scrubber zinc oxide bed can.

Table 1 below illustrates the fact that varying the temperature of the scrubber bed does appreciably affect ability of the bed to regenerate itself when a 1% CO by volume is added to the gas stream being desulfurized, as noted by the exit gas stream COS content.

TABLE 1

| | | EXIT SULFUR, PPM (DRY) | |
|---|---|---|---|
| $O_2$ (PPM) | BED TEMPERATURE (° C.) | COS | $H_2S$ |
| 1,000 | 121 | 10.4 | undetectable |
| 1,000 | 177 | >400 | undetectable |

Table 2 below illustrates the fact that when the concentration of $O_2$ is varied, and the amount of CO added to the fuel stream is increased to 11% by volume (dry), there is no appreciable resultant change in the regeneration of the catalyst bed.

TABLE 2

| | | EXIT SULFUR, PPM (DRY) | |
|---|---|---|---|
| $O_2$ (PPM) | BED TEMPERATURE (° C.) | COS | $H_2S$ |
| 200 | 85 | 0.88 | undetectable |
| 1,000 | 85 | 0.72 | undetectable |
| 200 | 121 | 44 | undetectable |
| 1,000 | 121 | 48 | undetectable |
| 200 | 177 | >400 | >350 |

Since many changes and variations of the disclosed embodiment of the invention may be made without departing from the inventive concept, it is not intended to limit the invention to the specific components described above.

What is claimed is:

1. A method for removing sulfur from a desulfurizing station in a fuel cell power plant, said method comprising the steps of:
   a) introducing a gas stream into said desulfurizing station, which gas stream contains carbon monoxide (CO); and
   b) reacting the CO in said gas stream with sulfur deposited on a sulfur scrubber bed in said desulfurizing station so as to form gaseous carbonyl sulfide (COS) in an effluent gas stream exiting the desulfurizing station so as to strip deposited sulfur from the sulfur scrubber bed.

2. The method of claim 1 wherein said scrubber bed is potassium-promoted activated carbon.

3. A method for regenerating a desulfurizing station which station is used to remove sulfur compounds from a hydrocarbon fuel stream so as to convert the hydrocarbon fuel stream into a low sulfur content fuel, which low sulfur content fuel is suitable for use in a fuel cell power plant, said method comprising the steps of:
   a) introducing a gas stream which contains carbon monoxide (CO) into said desulfurization station; and
   b) reacting the CO with sulfur on a sulfur scrubber bed in said desulfurization station to form gaseous carbonyl sulfide (COS) in an effluent gas stream exiting the desulfurizing station so as to remove sulfur from the sulfur scrubber bed.

4. The method of claim 3 comprising the further step of combusting the COS in the effluent gas stream.

5. A system for using an anode exhaust stream from a phosphoric acid fuel cell power plant for regenerating a sulfur scrubber station in the power plant, said system comprising:
   a) at least one exhaust line connecting the anodes of the power plant cell stack to a sulfur scrubber in the power plant so as to direct anode exhaust to the sulfur scrubber;
   b) at least one valve in said line for selectively opening and closing said line whereby anode exhaust can be selectively passed through said sulfur scrubber station to allow carbon monoxide in the anode exhaust to react with sulfur in the sulfur scrubber station to convert sulfur in the sulfur scrubber station to gaseous carbonyl sulfide; and
   c) a line from said sulfur scrubber station for removing gaseous carbonyl sulfide from said sulfur scrubber station.

6. The system of claim 5 wherein there are at least two sulfur scrubber stations, and there are separate lines connecting the anode exhaust line to each of said sulfur scrubber stations; each of said separate lines being provided with respective valves which can be selectively opened and closed so as to allow sequential regeneration of each of the sulfur scrubber stations.

7. A system for using at least a portion of reformer exhaust stream in a polymer electrolyte membrane fuel cell power plant for regenerating a sulfur scrubber station in the power plant, said system comprising:
   a) at least one exhaust line connecting the reformer of the power plant to the sulfur scrubber in the power plant so as to direct reformer exhaust to the sulfur scrubber;
   b) at least one valve in said line for selectively opening and closing said line whereby reformer exhaust can be selectively passed through said sulfur scrubber station to allow carbon monoxide in the reformer exhaust to react with sulfur in the sulfur scrubber station to convert sulfur in the sulfur scrubber station to gaseous carbonyl sulfide; and
   c) a line from said sulfur scrubber station for removing gaseous carbonyl sulfide from said sulfur scrubber station.

8. A system for using at least a portion of a carbon monoxide (CO) reduction station exhaust stream in a polymer electrolyte membrane fuel cell power plant for regenerating a sulfur scrubber station in the power plant, said system comprising:
   a) at least one exhaust line connecting the CO reduction station of the power plant to the sulfur scrubber in the power plant so as to direct CO reduction station exhaust to the sulfur scrubber;
   b) at least one valve in said line for selectively opening and closing said line whereby CO reduction station exhaust can be selectively passed through said sulfur scrubber station to allow carbon monoxide in the CO reduction station exhaust to react with sulfur in the sulfur scrubber station to convert sulfur in the sulfur scrubber station to gaseous carbonyl sulfide; and
   c) a line from said sulfur scrubber station for removing gaseous carbonyl sulfide from said sulfur scrubber station.

9. A method for removing sulfur from a desulfurizing station in a fuel cell power plant, said method comprising the steps of:
   a) introducing a gas stream into said desulfurizing station, which gas stream contains carbon monoxide (CO); and
   b) reacting the CO in said gas stream with sulfur deposited on a sulfur scrubber bed in said desulfurizing station, which sulfur scrubber bed includes a Group I metal, so as to form gaseous carbonyl sulfide (COS) in an effluent gas stream exiting the desulfurizing station so as to strip deposited sulfur from the sulfur scrubber bed.

10. The method of claim 9 wherein said gas stream contains about 1% by volume of CO.

11. The method of claim 9 wherein said reacting step is carried out at a temperature in the range of about 85° C. to about 177° C.

12. The method of claim 9 wherein said CO is derived from an anode exhaust stream of a fuel cell power plant stack assembly.

13. The method of claim 9 wherein said CO is derived from a CO reduction station or reformer exhaust stream of a fuel cell power plant.

14. The method of claim 9 comprising the further step of combusting the COS in the desulfurizing station effluent gas stream.

* * * * *